(12) United States Patent
Becker et al.

(10) Patent No.: US 11,904,410 B2
(45) Date of Patent: Feb. 20, 2024

(54) LASER SURFACE PREPARATION OF COATED SUBSTRATE

(71) Applicant: CORNING INCORPORATED, Corning, NY (US)

(72) Inventors: Alejandro Antonio Becker, Stockdorf (DE); Tobias Christian Roeder, Munich (DE); Helmut Schillinger, Munich (DE); Ralf J Terbrueggen, Neuried (DE)

(73) Assignee: Corning Incorporated, Corning, NY (US)

( * ) Notice: Subject to any disclaimer, the term of this patent is extended or adjusted under 35 U.S.C. 154(b) by 638 days.

(21) Appl. No.: 15/285,773

(22) Filed: Oct. 5, 2016

(65) Prior Publication Data

US 2017/0100801 A1 Apr. 13, 2017

Related U.S. Application Data

(60) Provisional application No. 62/238,356, filed on Oct. 7, 2015.

(51) Int. Cl.
*B23K 26/402* (2014.01)
*C03B 33/09* (2006.01)
(Continued)

(52) U.S. Cl.
CPC ........ *B23K 26/402* (2013.01); *B23K 26/0624* (2015.10); *B23K 26/0738* (2013.01); *B23K 26/082* (2015.10); *B23K 26/142* (2015.10); *B23K 26/18* (2013.01); *B23K 26/364* (2015.10); *B23K 26/40* (2013.01); *B26F 3/002* (2013.01);
(Continued)

(58) Field of Classification Search
CPC .............. B23K 26/0624; B23K 26/062; B23K 26/0622
See application file for complete search history.

(56) References Cited

U.S. PATENT DOCUMENTS 4,877,644 A * 10/1989 Wu ........................ C25D 5/022
427/556
4,937,129 A * 6/1990 Yamazaki ....... H01L 31/022466
428/195.1
(Continued)

FOREIGN PATENT DOCUMENTS

CN 101132880 A 2/2008
CN 104480476 A 4/2015
(Continued)

OTHER PUBLICATIONS

How Lasers work, https://lasers.llnl.gov/education/how_lasers_work, Lawrence Livermore National Laboratory.*
(Continued)

*Primary Examiner* — Evan H MacFarlane
*Assistant Examiner* — Fernando A Ayala
(74) *Attorney, Agent, or Firm* — Amy T. Lang (57) ABSTRACT

A method for laser preparation of a coated substrate to be laser cut is provided. The method includes substantially removing a target portion of a polymer coating from a coated substrate by directing an ablative laser beam to the target portion, wherein the target portion of the polymer coating has a width of between about 10 μm and about 6.0 mm.

22 Claims, 5 Drawing Sheets (51) Int. Cl.
| | |
|---|---|
| *B23K 26/142* | (2014.01) |
| *B23K 26/364* | (2014.01) |
| *B26F 3/06* | (2006.01) |
| *B23K 26/18* | (2006.01) |
| *C03C 17/32* | (2006.01) |
| *B23K 26/073* | (2006.01) |
| *B23K 26/082* | (2014.01) |
| *C03B 33/07* | (2006.01) |
| *B23K 26/40* | (2014.01) |
| *B23K 26/0622* | (2014.01) |
| *B26F 3/00* | (2006.01) |
| *B23K 103/00* | (2006.01) |
| *B23K 103/16* | (2006.01) |
| *B23K 101/34* | (2006.01) |

(52) U.S. Cl.
CPC .............. *B26F 3/06* (2013.01); *C03B 33/074* (2013.01); *C03B 33/091* (2013.01); *C03C 17/32* (2013.01); *B23K 2101/34* (2018.08); *B23K 2103/172* (2018.08); *B23K 2103/42* (2018.08); *B23K 2103/54* (2018.08); *C03C 2218/328* (2013.01)

(56) References Cited

U.S. PATENT DOCUMENTS

| | | | | |
|---|---|---|---|---|
| 5,035,918 | A | | 7/1991 | Vyas |
| 5,114,834 | A | | 5/1992 | Nachshon |
| 5,622,540 | A | * | 4/1997 | Stevens ................ C03B 33/091 219/121.6 |
| 5,672,760 | A | * | 9/1997 | Burns ................... C07C 315/04 257/E23.077 |
| 5,825,547 | A | * | 10/1998 | Lee ..................... G02B 5/1842 359/567 |
| 6,576,374 | B1 | * | 6/2003 | Kim ......................... G03F 1/30 430/323 |
| 7,633,033 | B2 | | 12/2009 | Thomas et al. |
| 8,029,501 | B2 | | 10/2011 | Miller |
| 8,361,828 | B1 | * | 1/2013 | Patterson ............. B23K 26/032 438/57 |
| 8,604,380 | B2 | | 12/2013 | Howerton et al. |
| 8,951,387 | B2 | * | 2/2015 | Kang .................. B29C 63/0013 156/716 |
| 2002/0105997 | A1 | * | 8/2002 | Zhang ..................... H01S 3/109 372/70 |
| 2004/0112882 | A1 | * | 6/2004 | Miyairi ............. B23K 26/1476 219/121.86 |
| 2008/0050888 | A1 | * | 2/2008 | Garner ................... B23K 26/40 438/463 |
| 2010/0102046 | A1 | * | 4/2010 | Huang ................. B23K 26/146 219/121.85 |
| 2010/0260973 | A1 | * | 10/2010 | Hoshiyama .......... B42D 25/333 428/156 |
| 2011/0091665 | A1 | * | 4/2011 | Heim ................... B42D 25/364 428/29 |
| 2011/0100967 | A1 | * | 5/2011 | Yoo ..................... B23K 26/032 219/121.73 |
| 2011/0223744 | A1 | | 9/2011 | Nobe et al. |
| 2012/0064303 | A1 | * | 3/2012 | Yashiki ................ B42D 25/324 428/172 |
| 2012/0084056 | A1 | * | 4/2012 | Bucher .............. G01B 11/0625 702/172 |
| 2012/0111310 | A1 | | 5/2012 | Ryu et al. |
| 2012/0211477 | A1 | * | 8/2012 | Chacin ................ B23K 26/035 219/121.69 |
| 2012/0213475 | A1 | * | 8/2012 | Selli ..................... G02B 6/4228 385/33 |
| 2012/0322235 | A1 | * | 12/2012 | Lei .......................... H01L 21/78 438/462 |
| 2012/0322240 | A1 | * | 12/2012 | Holden .............. B23K 26/0635 438/462 |
| 2012/0322242 | A1 | * | 12/2012 | Lei .......................... H01L 21/78 438/462 |
| 2013/0139932 | A1 | * | 6/2013 | Sakai ................... C21D 8/1272 148/565 |
| 2013/0220982 | A1 | | 8/2013 | Thomas et al. |
| 2014/0093693 | A1 | | 4/2014 | Zhang et al. |
| 2014/0167330 | A1 | * | 6/2014 | Parola .................... B82Y 30/00 264/478 |
| 2014/0199519 | A1 | | 7/2014 | Schillinger et al. |
| 2014/0370210 | A1 | * | 12/2014 | Schreiber .......... B32B 17/10403 428/34 |
| 2015/0243560 | A1 | * | 8/2015 | Yodo ................. H01L 21/31105 438/462 |
| 2015/0360500 | A1 | * | 12/2015 | Lok ...................... B42D 25/328 349/194 |
| 2015/0360991 | A1 | | 12/2015 | Grundmueller et al. |
| 2016/0013056 | A1 | * | 1/2016 | Kasai ....................... H05B 6/70 438/509 |
| 2016/0169531 | A1 | * | 6/2016 | Wagner ............... C03C 23/0025 428/172 |
| 2016/0370680 | A1 | * | 12/2016 | Geerlings ............. B23K 26/36 |
| 2017/0239751 | A1 | | 8/2017 | Luo et al. |
| 2019/0160842 | A1 | * | 5/2019 | Ueda ........................ B41M 3/06 |
| 2019/0165203 | A1 | * | 5/2019 | Wei ......................... H01L 31/18 |

FOREIGN PATENT DOCUMENTS

| | | |
|---|---|---|
| EP | 677402 A1 | 10/1995 |
| GB | 2481190 A | 12/2011 |
| JP | 2011-097024 A | 5/2011 |
| JP | 2011155070 A | 8/2011 |
| WO | 2008119949 A1 | 10/2008 |
| WO | 2014079478 A1 | 5/2014 |
| WO | 2014079570 A1 | 5/2014 |
| WO | 2014111385 A1 | 7/2014 |
| WO | 2014111794 A1 | 7/2014 |

OTHER PUBLICATIONS

National Laboratory paper on How lasers work, lawrence (Year: 2014).*
English Translation of the First Office Action in Corresponding Chinese Patent Application No. 201680058933.3 dated Aug. 5, 2019; 9 Pgs; China Patent Office.
International Searching Authority; Patent Cooperation Treaty; International Search Report and Written Opinion; International Application No. PCT/US2016/055451; dated Jan. 9, 2017; pp. 1-12.

* cited by examiner

LASER SURFACE PREPARATION OF COATED SUBSTRATE

This application claims the benefit of priority under 35 U.S.C. § 119 of U.S. Provisional Application Ser. No. 62/238,356 filed on Oct. 7, 2015 the content of which is relied upon and incorporated herein by reference in its entirety.

FIELD

The present disclosure relates generally to coated substrates and, in particular, to methods for laser preparation of a coated substrate to be laser cut.

BACKGROUND

Advancements in precision micromachining and related process improvements made to reduce size, weight and material costs have facilitated fast pace growth of products such as, but not limited to, flat panel displays for touch screens, tablets, smartphones and televisions. As a result of these advancements, ultrafast industrial lasers have become important tools for applications requiring high precision micromachining. Laser cutting processes utilizing such lasers are expected to separate substrates in a controllable fashion, to form negligible debris and to cause minimal defects and low subsurface damage to the substrate. Without limiting the present disclosure, certain laser cutting processes meet these expectations by forming a vertical fault line, or damage track, that establishes a path of least resistance for crack propagation along which the substrate is separated. These processes confine cracking and separation to the damage track and prevent or minimize cracking in any other part of the substrate.

Coatings on surfaces of substrates can reduce the effectiveness of laser cutting processes. For example, a coating may absorb some of a laser beam, altering propagation of the laser beam to an interior portion of the substrate. This in turn limits the amount of laser energy that reaches the interior portion of the substrate, which reduces the quality of the damage track formed in the substrate. As such, confining crack propagation to the damage track becomes less predictable and less controllable and separation of the substrate is rendered more difficult. Additionally, separation of the coated substrate may form unacceptable amounts of debris, and also may cause defects or subsurface damage to the separated portions of the substrate.

SUMMARY

According to an embodiment of the present disclosure, a method for laser preparation of a coated substrate to be laser cut is provided. The method includes substantially removing a target portion of a polymer coating from a coated substrate by directing an ablative laser beam to the target portion, wherein the target portion of the polymer coating has a width of between about 10 μm and about 6.0 mm.

According to another embodiment of the present disclosure, a method for laser cutting a coated substrate is provided. The method includes substantially removing a plurality of target portions of a polymer coating from a coated substrate to form a predetermined coating removal pattern by directing an ablative laser beam to the plurality of target portions. The method further includes directing a cutting laser beam along the predetermined coating removal pattern, and separating the coated substrate into at least two coated parts. The predetermined coating removal pattern has a width of between about 10 μm and about 6.0 mm.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The disclosure will be understood more clearly from the following description and from the accompanying figures, given purely by way of non-limiting example, in which.

DETAILED DESCRIPTION

Reference will now be made in detail to the present embodiment(s), an example(s) of which is/are illustrated in the accompanying drawings. Whenever possible, the same reference numerals will be used throughout the drawings to refer to the same or like parts.

The singular forms "a," "an" and "the" include plural referents unless the context clearly dictates otherwise. The endpoints of all ranges reciting the same characteristic are independently combinable and inclusive of the recited endpoint. All references are incorporated herein by reference.

The present disclosure is described below, at first generally, then in detail on the basis of several exemplary embodiments. The features shown in combination with one another in the individual exemplary embodiments do not all have to be realized. In particular, individual features may also be omitted or combined in some other way with other features shown of the same exemplary embodiment or else of other exemplary embodiments.

Embodiments of the present disclosure relate to methods for laser preparation of a coated substrate to be laser cut and to methods for laser cutting a coated substrate. As described herein, coated substrates are coated with a polymer coating. For example, a polymer coating may include, but is not limited to, high-refractive-index polymers (HRIP), protective polymer films, and photoresist materials. As used herein, the term high-refractive-index polymers (HRIP) is used to refer to a polymer having a refractive index of greater than 1.50. Also as described herein, a substrate is a material transparent to the wavelength of an ablative laser beam which may be, but is not limited to, glass, fused silica, sapphire or any other material transparent to the wavelength of an ablative laser beam.

According to embodiments of the present disclosure, a method for laser preparation of a coated substrate includes substantially removing a target portion of a polymer coating by directing an ablative laser beam to the target portion. Preferably, substantially removing a target portion of a polymer coating includes removing about 100% of the polymer at the target portion of the polymer coating. However, it is also contemplated that substantially removing a target portion of a polymer coating may include removing greater than about 90%, or greater than about 95%, or even greater than about 98% of the polymer at the target portion of the polymer coating. As used herein, the term "ablative laser beam" is a laser beam that is configured to cause ablation of a polymer coating material. The ablative laser beam may be emitted from a picosecond laser or a femtosecond laser where the lasers are pulsed lasers that may be configured to generate a single laser pulse, or burst of pulses, to form the ablative laser beam to interact with the polymer coating of the coated substrate. The ablative laser beam may have a wavelength that is absorbed by the polymer coating. By being absorbed by the polymer coating, the laser beam does not pass into the underlying substrate and does not heat or cause stress in the underlying substrate. Alternatively, the ablative laser beam may have an intensity at the target portion that generates multiphoton absorption in the polymer coating within the focal volume of the ablative laser beam. The wavelength and/or the intensity of the ablative laser beam vary based on the polymer coating material of the coated substrate. Additionally, the pulse duration of the laser may be chosen such that no significant heat diffusion out of the target portion can take place within the time of interaction (specifically for example: $\tau \ll d^2/\alpha$, where d is the focus diameter of the laser beam, $\tau$ is the laser pulse duration, and $\alpha$ is the heat diffusion constant of the polymer material).

Directing an ablative laser beam to a target portion may include applying at least one laser pulse to the target portion of the polymer coating. Following ablation at the target portion of the polymer coating, the ablative laser beam may be aligned with a subsequent target portion of the polymer coating such that a subsequent laser pulse is applied to the subsequent target portion of the polymer coating to substantially remove the subsequent target portion from the coated substrate. Following ablation at the subsequent target portion of the polymer coating, the ablative laser beam may be realigned any number of times necessary for subsequent laser pulses to be applied to subsequent target portions of the polymer coating and continuing according to a predetermined coating removal pattern. As the ablative laser beam may be focused to a rounded spot having a diameter and a circumference, removing target portions according to a predetermined coating removal pattern may be performed by overlapping a part of the focused spot of the ablative laser beam with a part of the previously removed target portion. In this way, the predetermined coating removal pattern may be a substantially straight line having a substantially uniform width. As described below, the width of the predetermined coating removal pattern may be substantially equal to the diameter of the focused spot of the ablative laser beam. In any case, the width of the predetermined coating removal pattern is substantially equal to the width of the target portion which may be, for example, between about 10 μm and about 6.0 mm, for example, between about 100 μm and about 4 mm, or even between about 200 μm and about 2.0 mm. Any number of laser pulses may be applied to each of the target portions in order to substantially remove the target portion of the polymer coating. In certain circumstances, one laser pulse per target portion may be sufficient to substantially remove each target portion of the polymer coating. Alternatively, two or more laser pulses may be applied to each of the target portions to remove the target portions of the polymer coating.

Directing an ablative laser beam to a target portion may include positioning a source of the ablative laser beam proximate to a coated surface of the coated substrate and applying at least one laser pulse to the target portion of the polymer coating. Alternatively, where the coated substrate includes at least one uncoated surface, directing an ablative laser beam to a target portion may include positioning a source of the ablative laser beam proximate to the at least one uncoated surface, and applying at least one laser pulse to the target portion of the polymer coating by directing the ablative laser beam toward the at least one uncoated surface, and through the substrate to the polymer coating.

Directing an ablative laser beam to a target portion may be performed by forming a relatively large focused spot on the target portion of the polymer coating. As used herein, a relatively large focused spot is a laser beam spot having a diameter that is substantially equal to the width of the target portion of the polymer coating. An ablative laser beam having such a relatively large focused spot can form the predetermined coating removal pattern by moving the ablative laser beam (or moving the coated substrate) in the x or y direction and without any additional scanning in an angular direction. Alternatively, directing an ablative laser beam to a target portion may be performed by forming a relatively small focused spot on the target portion of the polymer coating. As used herein, a relatively small focused spot is a laser beam spot having a diameter that is less than the width of the target portion of the polymer coating. Such a relatively small focused spot cannot form the predetermined coating removal pattern by moving the ablative laser beam (or moving the coated substrate) in the x or y direction alone. With a laser pulse of such a relatively small focused spot, the ablative laser beam can also be scanned in an angular direction to be directed at additional parts of the target portions to remove the target portions.

Generally, preparation of a coated substrate to be laser cut is performed to remove target portions of a polymer coating only along a predetermined coating removal pattern without removing other portions of the polymer coating of the coated substrate. When directing a cutting laser beam along the predetermined coating removal pattern after the target portions of the polymer coating have been removed, the cutting laser beam will not contact the other portions of the polymer coating of the coated substrate. This in turn minimizes removal or deterioration of the other portions of the polymer coating while also preventing any altering effect the polymer coating may have on the propagation of the cutting laser beam. According to embodiments of the present disclosure, the target portion has a width wide enough to accommodate a cutting laser beam.

Embodiments of the present disclosure may further include extracting residual products from the removal of target portions of the polymer coating. An apparatus having at least one suction opening may be positioned proximate to, such as above, the target portion of the polymer coating such that a negative pressure is formed and the residual products are directed to, and extracted through, the at least one suction opening during the removal of a target portion of a polymer coating. Additionally, an apparatus having at least one discharge opening may also be positioned proximate to the target portion of the polymer coating to direct gas to the target portion of the polymer coating. The apparatus having at least one suction opening may be different from the apparatus having at least one discharge opening. Alternatively, an apparatus may include both the at least one suction opening and the having at least one discharge opening. Embodiments of the present disclosure may include any number of discharge openings. In conjunction with the at least one suction opening, the flow of gas from the at least one discharge opening forms a gas throughput that directs the residual products from the target portion to the at least one suction opening and minimizes the spread of the residual products to the other portions of the coated substrate. In embodiments where the ablative laser beam is scanned in an angular direction, the at least one suction opening may be moved to maintain a position proximate to, such as above, the target portion of the polymer coating, and/or the at least one discharge opening may be moved to maintain a position at which gas can be directed to the target portion of the polymer coating. Alternatively, the coated substrate may be moved to maintain the position of the at least one suction opening and/or the at least one discharge opening.

Figure 1:
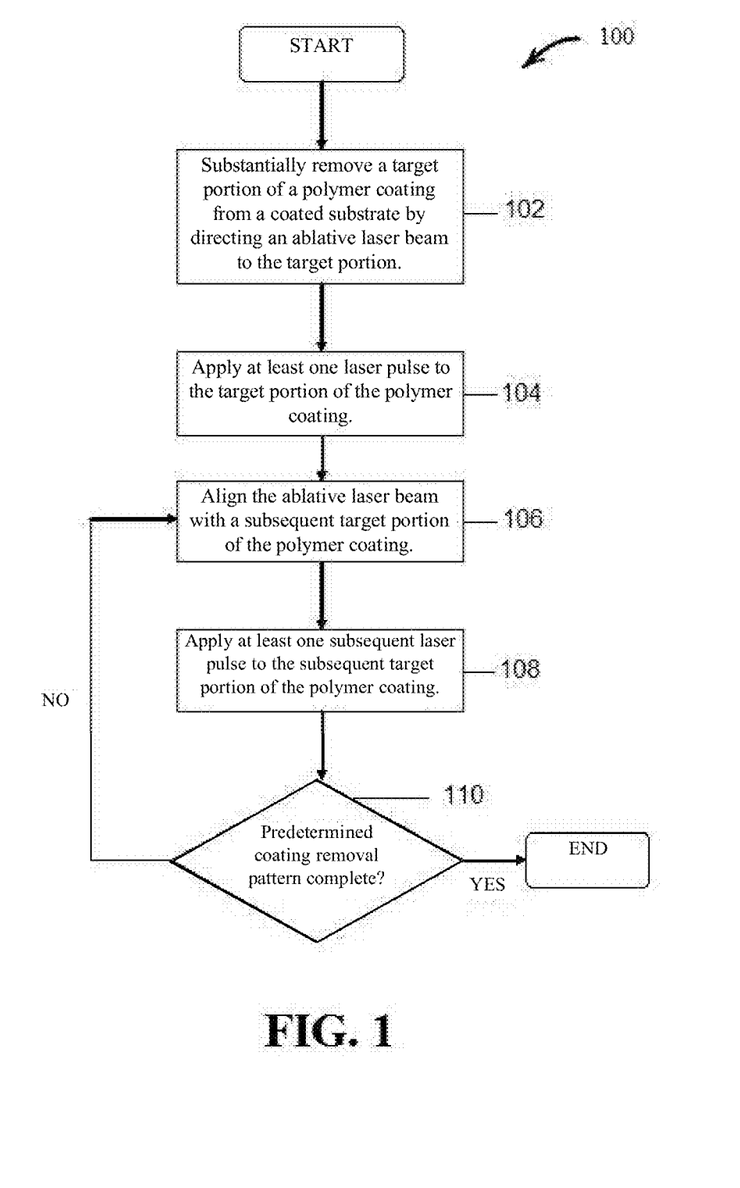
FIG. 1 is a flow chart illustrating a method for laser preparation of a coated substrate to be laser cut according to an embodiment of the present disclosure.

FIG. 1 is a flow chart 100 illustrating a method for laser preparation of a coated substrate to be laser cut according to an embodiment of the present disclosure. As shown, in step 102 a target portion of a polymer coating is substantially removed from a coated substrate by directing an ablative laser beam to the target portion. At step 104, at least one laser pulse is applied to the target portion of the polymer coating. At step 106, the ablative laser beam is aligned with a subsequent target portion of the polymer coating. At step 108, at least one subsequent laser pulse is applied to the subsequent target portion of the polymer coating. At step 110, it is determined if the predetermined coating removal pattern is complete. If it is not, the method returns to step 106 where the ablative laser beam is aligned with a subsequent target portion of the polymer coating. If it is determined that the coating removal pattern is complete the method may be terminated.

Embodiments of the present disclosure also relate to methods for laser cutting a coated substrate. Subsequent to preparation of the coated substrate, in which a plurality of target portions of the polymer coating are substantially removed along a predetermined coating removal pattern by directing an ablative laser beam to the plurality of target portions, a cutting laser beam may be directed along the predetermined coating removal pattern after the target portions of the polymer coating have been removed for the purpose of separating the coated substrate into multiple coated parts. As described above, embodiments of the present disclosure facilitate directing a cutting laser beam along the predetermined coating removal pattern wherein the cutting laser beam does not contact the other portions of the polymer coating of the coated substrate.

Directing a cutting laser beam along the predetermined coating removal pattern includes focusing a pulsed cutting laser beam into a laser beam focal line in the coated substrate to generate induced absorption along the cutting laser beam focal line in the coated substrate. The pulsed cutting laser beam is focused at a plurality of locations in the coated substrate to generate induced absorption along the cutting laser beam focal line in the coated substrate and to form a damage track along the cutting laser beam focal line at each of the plurality of locations in the coated substrate. For each laser pulse, an individual damage track is produced in the coated substrate along the cutting laser beam focal line. A series of these damage tracks formed at each of the plurality of locations in the coated substrate may be set close enough together along the predetermined coating removal pattern to form a lateral connection of the damage tracks along which the coated substrate may be separated. For this, the laser is pulsed at a specific repetition rate. The spot size and spacing are chosen such that a desired damage track formation occurs at the surface, along the line of the laser spots.

Embodiments of the present disclosure may further include separating the coated substrate into at least two coated parts. The coated substrate is preferably separated along lateral connection of the damage tracks. Separating the coated substrate may include applying thermal stress to the coated substrate. The thermal stress may be, for example, uneven heating or cooling of the coated substrate. The thermal stresses may be applied by irradiating the coated substrate with a $CO_2$ laser along the lateral connection of the damage tracks. Alternatively, separating the coated substrate may include applying mechanical stress to the coated substrate. Applying such stresses has the effect of assisting crack propagation along the individual damage tracks and along the lateral connection of the damage tracks such that the substrate can be separated into multiple coated parts.

According to embodiments of the present disclosure, the wavelength of the cutting laser beam may be substantially transparent to the material of the substrate. By substantially transparent, it is meant that the decrease in intensity of the cutting laser beam taking place along the direction of the beam in the substrate per millimeter of the depth of penetration is about 15% or less. The laser may be, for example, an Nd:YAG laser with a wavelength of 1064 nm or a Yb:YAG laser with a wavelength of 1030 nm, or, in particular for semiconductor substrates that are transparent in the infrared wavelength range, an Er:YAG laser with a wavelength of between about 1.5 µm and about 1.8 µm.

The pulse duration of the cutting laser beam may be chosen such that no significant heat diffusion out of the zone of interaction can take place within the time of interaction (specifically for example: $\tau \ll d^2/\alpha$, where d is the focus diameter, $\tau$ is the laser pulse duration, and $\alpha$ is the heat diffusion constant of the substrate material). The pulse energy of the cutting laser beam may be chosen such that the intensity in the zone of interaction, that is to say in the focal line, produces an induced absorption, which leads to the formation of a damage track corresponding to the focal line. The focal line may have a length of between about 0.1 mm and about 100 mm.

The polarization of the cutting laser beam may influence both the interaction at the surface (reflectivity) and the type of interaction within the material where the induced absorption takes place. The induced absorption may take place by way of induced, free charge carriers (typically electrons), either after thermal excitation, or by way of multiphoton absorption and internal photoionization, or by way of direct field ionization (field strength of the light breaks electron bonding directly). The type of generation of the charge carriers can be assessed for example by way of the so-called Keldysh parameter. In the case of certain materials (for example birefringent materials) it may just be important that the further absorption/transmission of the laser light depends on the polarization, and consequently the polarization by way of suitable optics may be chosen by the user to be conducive for separating the respective material, for example simply in a heuristic way. Therefore, if the material is not optically isotropic, but for example birefringent, the propagation of the laser light in the material is also influenced by the polarization. Thus, the polarization and the orientation of the polarization vector may be chosen such that, as desired, there only forms one focal line and not two (ordinary and extraordinary rays).

Furthermore, the intensity may be chosen on the basis of the pulse duration, the pulse energy and the focal line diameter such that there is preferably no significant ablation or significant melting, but preferably only damage track formation, in the microstructure of the substrate. For typical materials such as glass or transparent crystals, this requirement can be satisfied most easily with pulsed lasers in the sub-nanosecond range, that is to say in particular with pulse durations of, for example, between about 0.1 ps and about 100 ps, and preferably less than about 15 ps.

In some embodiments, the average diameter $\delta$ of the cutting laser beam focal line, that is to say the spot diameter, is between about 0.3 μm and about 5.0 μm, preferably between about 1.0 μm and about 3.0 μm, more preferably between about 0.4 μm and about 4.0 μm, and even more preferably is about 2.0 μm, and/or in that the pulse duration $\tau$ of the cutting laser beam is chosen such that, within the time of interaction with the material of the substrate, the heat diffusion in the material is negligible, preferably no heat diffusion takes place, for which preferably $\tau$, $\delta$ and the heat diffusion constant $\alpha$ of the material of the substrate are set according to $\tau<<\delta^2/\alpha$ and/or preferably $\tau$ is chosen to be less than about 10 ns, preferably less than about 100 ps, and/or in that the pulse repetition rate of the cutting laser beam is between about 10 kHz and about 1000 kHz (e.g., about 100 kHz), and/or in that the cutting laser beam is operated as a single-pulse laser or as a burst-pulse laser, with energies per burst pulse of between about 40 uJ and about 1000 uJ, and/or in that the average laser power, measured directly on the output side of the cutting laser beam, is between about 10 watts and about 100 watts, for example, between about 30 watts and about 50 watts.

Figure 2:
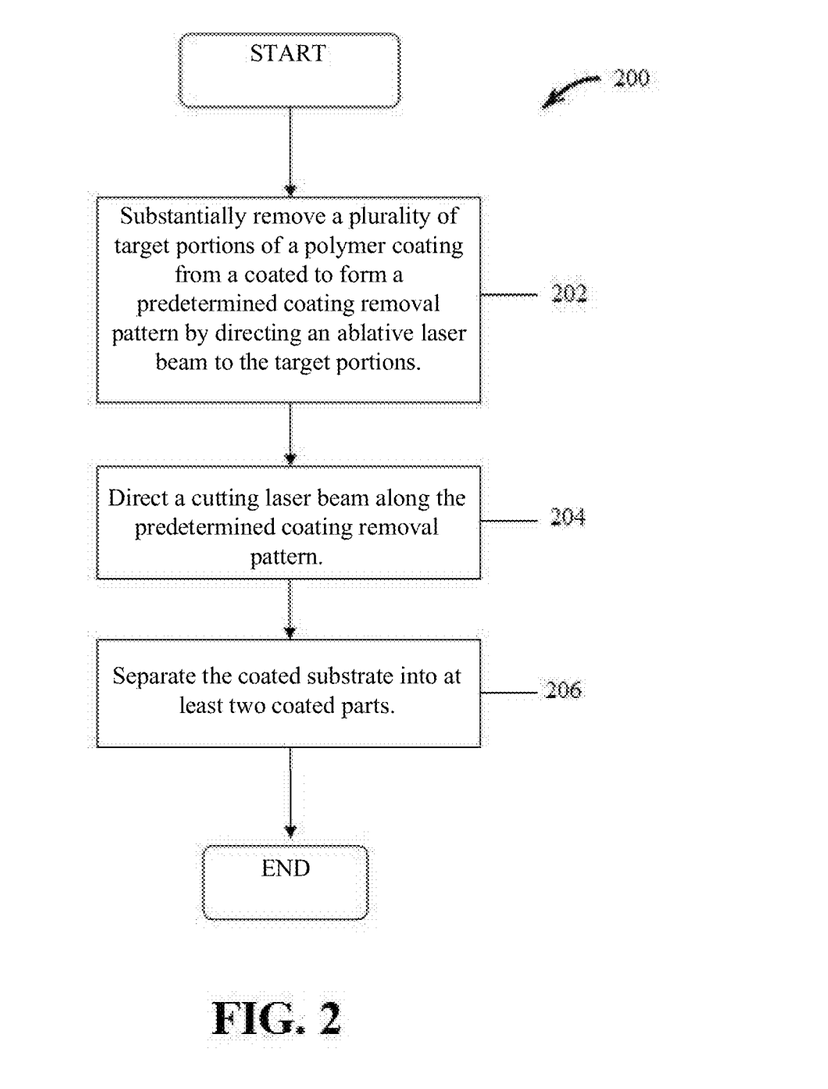
FIG. 2 is a flow chart illustrating a method for laser cutting a coated substrate according to an embodiment of the present disclosure.

FIG. 2 is a flow chart 200 illustrating a method for laser cutting a coated substrate according to an embodiment of the present disclosure. As shown, in step 202 a plurality of target portions of a polymer coating are substantially removed from a coated to form a predetermined coating removal pattern by directing an ablative laser beam to the target portions. At step 204, a cutting laser beam is directed along the predetermined coating removal pattern. At step 206, the coated substrate is separated into at least two coated parts. Once the coated substrate is separated, the method may be terminated.

Figure 3A:
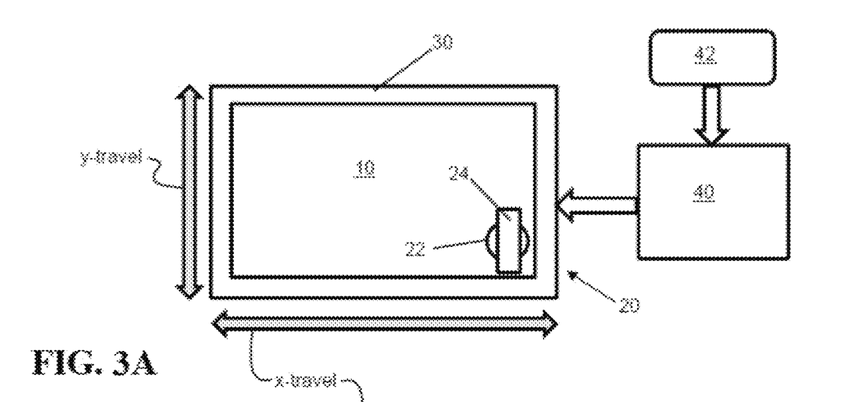
FIGS. 3A and 3B are diagrammatic depictions of an assembly for performing laser preparation of a coated substrate according to embodiments of the present disclosure.
Figure 3B:
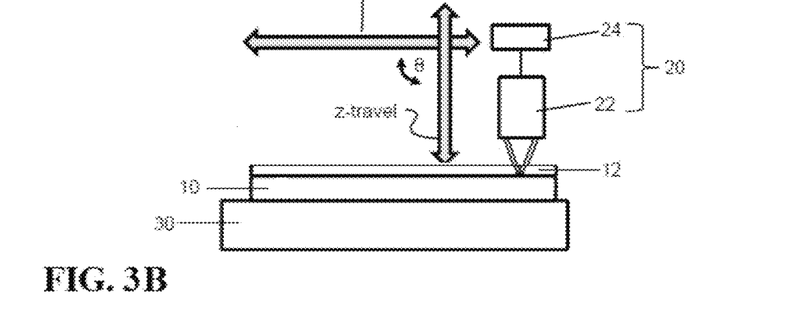

FIGS. 3A and 3B depict an assembly 1 for performing laser preparation of a coated substrate according to embodiments of the present disclosure. As shown, the coated substrate 10 having a polymer coating 15 may be disposed on a platform 30. Briefly, a laser system 20 is employed to generate a laser beam under the direction of a controller 40. The laser system 20 includes a laser light source 24 for providing a pulsed laser beam, and an optical system 22 for guiding the pulsed laser beam from the laser light source to the coated substrate 10. The platform 30 may be employed as a translation mechanism for positioning the coated substrate 10 with respect to the laser beam guided by the optical system 22.

The control system 40 may be configured as a highly automated apparatus that is substantially controlled by a computer-aided manufacturing program 42 that may generate an executable file that directs the relative motion between the platform 30 and the laser assembly 20. FIG. 3A illustrates the relative movement between the laser assembly 20 and the coated substrate 10 in the x-y plane. FIG. 3B is a side view that illustrates the relative movement between the laser assembly 20 and the coated substrate 10 in the z-direction and in the angular direction θ.

According to embodiments of the present disclosure, apparatus 1 may include a stationary laser assembly 20, wherein the platform 30 is configured to move beneath the laser assembly 20. Alternatively, apparatus 1 may include a stationary platform 30, wherein the laser assembly 20 is configured to move above the platform 30. It is also contemplated that both the platform 30 and the laser assembly 20 are configured to move. The platform 30 may be, for example, a programmable numerical control (CNC) apparatus. For example, the platform 30 may be configured to move in one axial direction whereas the laser assembly 20 is configured to move along the remaining axes. The program 42 may also be configured to control the laser parameters and the optical parameters of the laser system 20.

The control system 40 is configured to operate the laser assembly 20 in order to precisely form a laser beam focused spot at a precise location on the polymer coating 15 of the coated substrate 10. The laser system 20 includes a pulsed laser 24 that operates in conjunction with an optical system 22. To be specific, the control unit 40 is configured to control the optical system 22 and the pulsed laser 24 the laser system 20, under the control of controller 40, generates a single laser pulse, or burst of pulses, of a pulsed line focus laser beam to interact with the polymer coating 12 of the coated substrate 10. The laser beam is characterized by a focused spot that generates an induced absorption within the polymer material so that a material modification is produced. This material modification is referred to herein as ablation, which describes the thermochemical disassociation, vaporization, and removal of polymer material because of incident convective and/or radiant heat energy. The control system 40 may be implemented using a programmable numerical control (CNC) apparatus.

Reference is made to U.S. Published Patent Application No. US2014/0199519, the specification of which is incorporated by reference in its entirety, for a more detailed explanation of the laser system 20 in general, and the laser light source 24, in particular. Reference is also made to International Published Patent Application No WO2014/079570, the specification of which is incorporated by reference in its entirety, for a more detailed explanation of the laser system 20 in general, and the laser light source 24, in particular.

Figure 4A:
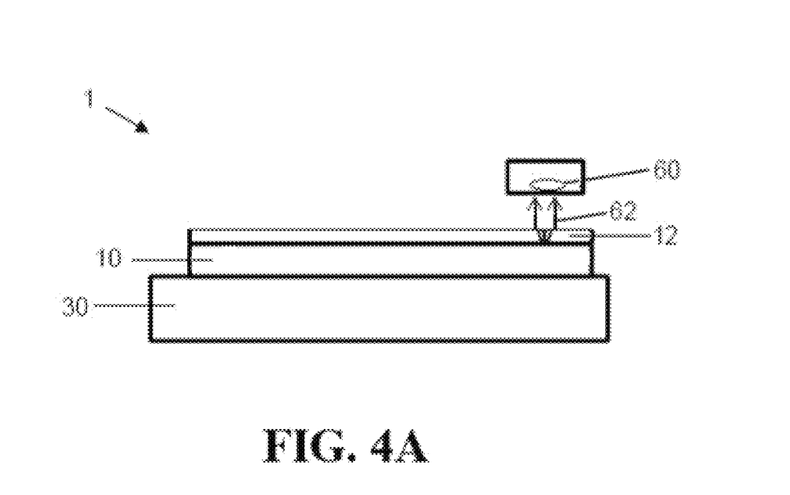
FIGS. 4A and 4B are diagrammatic depictions of an assembly for performing laser preparation of a coated substrate according to embodiments of the present disclosure.
Figure 4B:
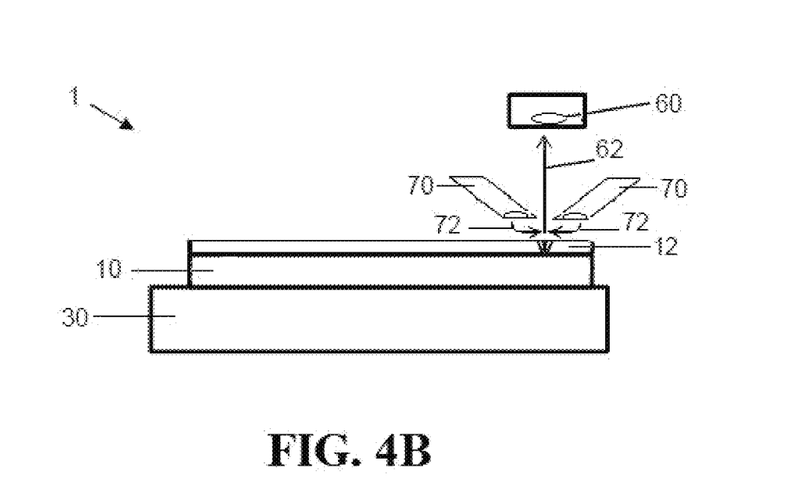

FIGS. 4A and 4B depict additional features of an assembly 1 for performing laser preparation of a coated substrate according to embodiments of the present disclosure. For purposes of clarity, the laser system 20 is not shown in FIGS. 4A and 4B, however, it should be understood that the assemblies depicted in the figures include the laser system 20 shown in FIGS. 3A and 3B. As shown in FIG. 4A, an apparatus having a suction opening 60 may be placed above the target portion of the polymer coating 12 of the coated substrate 10. Arrows 62 generally depict the flow of residual products from the target portion to the suction opening 60. Additionally, as shown in FIG. 4B, at least one discharge opening 70 may also be positioned to direct gas to the target portion of the polymer coating 12. FIG. 4B illustrates an assembly having two discharge openings 70, but the assembly may include any number of discharge openings 70.

Arrows 72 generally depict the flow of gas from the discharge openings 70 to the target portion, and arrow 62 generally depicts the flow of the combination of gas and residual products from the target portion to the suction opening 60. In conjunction with the suction opening 60, the flow of gas from the at least one discharge opening 70 forms a gas throughput that directs the residual products from the target portion to the suction opening 60 and minimizes the spread of the residual products on the coated substrate 10.

Figure 5A:
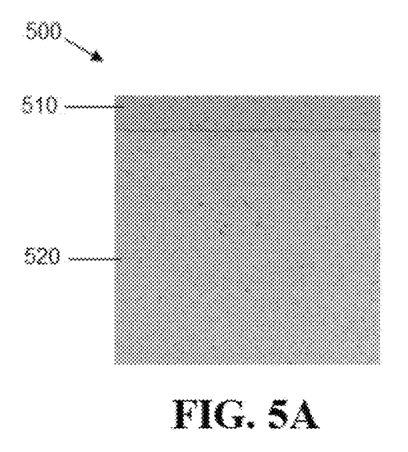
FIG. 5A is an optical microscope image of a coated substrate prepared for laser cutting.
Figure 5B:
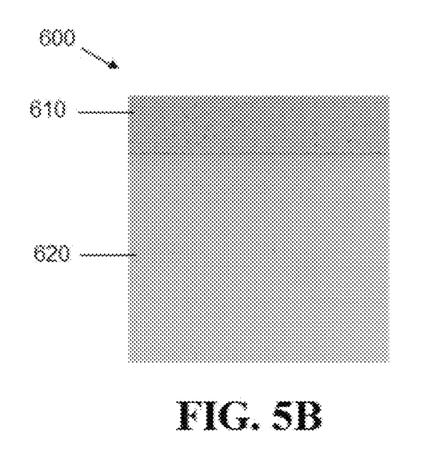
FIG. 5B is an optical microscope image of a coated substrate prepared for laser cutting in accordance with embodiments of the present disclosure.

FIGS. 5A and 5B are optical microscope images that illustrate two comparative coated substrates 500, 600 coated with a polymer coating. The substrates are glass substrates including a polymer coating having a thickness of about 500 nm. Portions of the polymer coating of each of the coated substrates 500, 600 were prepared for laser cutting. FIG. 5A shows the first coated substrate 500 having a polymer coating portion 520 and a coating removal pattern 510. The first coated substrate 500 was prepared for laser cutting using an assembly without a suction opening. FIG. 5B shows the second coated substrate 600 having a polymer coating portion 620 and a coating removal pattern 610. The second coated substrate 600 was prepared for laser cutting using an assembly with a suction opening. As can be seen in FIG. 5A, the residual products from the removal of target portions of the polymer coating of the first coated substrate 500 spread to the polymer coating portion 520 during and after laser preparation of the first coated substrate 500. In contrast, as can be seen in FIG. 5B, both the spread of the residual products to the polymer coating 620, as well as the redeposition of the residual products in the coating removal pattern 610, are reduced when laser preparation is performed using an assembly having a suction opening.

According to an aspect (1) of the present disclosure, a method for laser preparation of a coated substrate to be laser cut is provided. The method comprises substantially removing a target portion of a polymer coating from a coated substrate by directing an ablative laser beam to the target portion, wherein the target portion of the polymer coating has a width of between about 10 µm and about 6.0 mm.

According to another aspect (2) of the present disclosure, the method of aspect (1) is provided, wherein the ablative laser beam has a wavelength that is absorbed by the polymer coating.

According to another aspect (3) of the present disclosure, the method of any of aspects (1)-(2) is provided, wherein the ablative laser beam has an intensity that generates multiphoton absorption in the polymer coating within a focal volume of the ablative laser beam.

According to another aspect (4) of the present disclosure, the method of any of aspects (1)-(3) is provided, wherein directing the ablative laser beam to the target portion comprises applying at least one laser pulse to the target portion of the polymer coating.

According to another aspect (5) of the present disclosure, the method of aspect (4) is provided further comprising, subsequent to applying the at least one laser pulse to the target portion of the polymer coating, aligning the ablative laser beam with a subsequent target portion of the polymer coating and applying at least one subsequent laser pulse to the subsequent target portion of the polymer coating to substantially remove the subsequent target portion of the polymer coating from the coated substrate.

According to another aspect (6) of the present disclosure, the method of aspect (5) is provided, wherein at least a part of the subsequent target portion of the polymer coating overlaps with at least a part of the target portion of the polymer coating.

According to another aspect (7) of the present disclosure, the method of any of aspects (5)-(6) is provided, wherein aligning the ablative laser beam with the subsequent target portion of the polymer coating is performed according to a predetermined coating removal pattern.

According to another aspect (8) of the present disclosure, the method of aspect (7) is provided, wherein the predetermined coating removal pattern is a substantially straight line having a substantially uniform width.

According to another aspect (9) of the present disclosure, the method of aspect (8) is provided, wherein the substantially uniform width of the predetermined coating removal pattern is substantially equal to the width of the target portion of a polymer coating.

According to another aspect (10) of the present disclosure, the method of any of aspects (5)-(9) is provided, wherein aligning the ablative laser beam with a subsequent target portion of the polymer coating comprises moving one of the coated substrate and the ablative laser beam in one of the x and y direction.

According to another aspect (11) of the present disclosure, the method of aspect (10) is provided, wherein aligning the ablative laser beam with a subsequent target portion of the polymer coating further comprises scanning the ablative laser beam in an angular direction.

According to another aspect (12) of the present disclosure, the method of any of aspects (1)-(11) is provided, wherein directing an ablative laser beam to the target portion comprises positioning a source of the ablative laser beam proximate to a coated surface of the coated substrate and applying at least one laser pulse to the target portion of the polymer coating.

According to another aspect (13) of the present disclosure, the method of any of aspects (1)-(11) is provided, wherein directing an ablative laser beam to the target portion comprises positioning a source of the ablative laser beam proximate to at least one uncoated surface of the coated substrate and applying at least one laser pulse to the target portion of the polymer coating by directing the ablative laser beam toward the at least one uncoated surface and through the coated substrate to the polymer coating.

According to another aspect (14) of the present disclosure, the method of any of aspects (1)-(13) is provided further comprising extracting residual products from the removal of the target portion of the polymer coating.

According to another aspect (15) of the present disclosure, the method of aspect (14) is provided further comprising positioning an apparatus having at least one suction opening proximate to the target portion of the polymer coating.

According to another aspect (16) of the present disclosure, the method of aspect (15) is provided further comprising positioning at least one gas discharge opening proximate to the target portion of the polymer coating.

According to another aspect (17) of the present disclosure, the method of any of aspects (1)-(16) is provided, wherein the target portion of the polymer coating has a width of between about 100 µm and about 4.0 mm.

According to another aspect (18) of the present disclosure, the method of any of aspects (1)-(17) is provided, wherein the target portion of the polymer coating has a width of between about 200 µm and about 2.0 mm.

According to another aspect (19) of the present disclosure, the method of any of aspects (1)-(18) is provided, wherein the polymer coating comprises a material is selected from the group consisting of high-refractive-index polymers (HRIP), protective polymer films, and photoresist materials.

According to another aspect (20) of the present disclosure, the method of any of aspects (1)-(19) is provided, wherein the coated substrate comprises a material transparent to the wavelength of the ablative laser beam.

According to another aspect (21) of the present disclosure, the method of aspect (20) is provided, wherein the material transparent to the wavelength of the ablative laser beam is selected from the group consisting of glass, fused silica and sapphire.

According to an aspect (22) of the present disclosure, a method for laser cutting a coated substrate is provided. The method comprises substantially removing a plurality of target portions of a polymer coating from a coated substrate to form a predetermined coating removal pattern by directing an ablative laser beam to the plurality of target portions, directing a cutting laser beam along the predetermined coating removal pattern; and separating the coated substrate into at least two coated parts, wherein the predetermined coating removal pattern has a width of between about 10 µm and about 6.0 mm.

According to another aspect (23) of the present disclosure, the method of aspect (22) is provided, wherein directing the cutting laser beam along the predetermined coating removal pattern comprises focusing the cutting laser beam into a cutting laser beam focal line at a plurality of locations in the coated substrate to generate induced absorption along the cutting laser beam focal line in the coated substrate and to form a damage track along the cutting laser beam focal line at each of the plurality of locations in the coated substrate.

According to another aspect (24) of the present disclosure, the method of aspect (23) is provided, wherein the damage tracks at each of the plurality of locations in the coated substrate form a lateral connection of damage tracks.

According to another aspect (25) of the present disclosure, the method of any of aspects (23)-(24) is provided, wherein the cutting laser beam focal line has a length of between about 0.1 mm and about 100 mm.

According to another aspect (26) of the present disclosure, the method of any of aspects (22)-(25) is provided, wherein directing the ablative laser beam to the plurality of target portions comprises applying at least one laser pulse to each of the plurality of target portions of the polymer coating.

According to another aspect (27) of the present disclosure, the method of any of aspects (22)-(26) is provided, wherein directing a cutting laser beam along the predetermined coating removal pattern comprises directing the cutting laser beam such that the cutting laser beam does not contact the polymer coating of the coated substrate.

According to another aspect (28) of the present disclosure, the method of any of aspects (22)-(27) is provided, wherein separating the coated substrate into at least two coated parts comprises applying thermal stress to the coated substrate.

According to another aspect (29) of the present disclosure, the method of aspect (28) is provided, wherein applying thermal stress to the coated substrate comprises applying a $CO_2$ laser along the predetermined coating removal pattern.

According to another aspect (30) of the present disclosure, the method of any of aspects (22)-(27) is provided, wherein separating the coated substrate into at least two coated parts comprises applying mechanical stress to the coated substrate.

According to another aspect (31) of the present disclosure, the method of any of aspects (22)-(30) is provided, wherein the cutting laser beam is generated by a pulsed laser source.

According to another aspect (32) of the present disclosure, the method of any of aspects (22)-(31) is provided, wherein the cutting laser beam is generated by a laser source selected from the group consisting of an Nd:YAG laser with a wavelength of 1064 nm, a Yb:YAG laser with a wavelength of 1030 nm, and an Er:YAG laser with a wavelength of between about 1.5 µm and about 1.8 µm.

According to another aspect (33) of the present disclosure, the method of any of aspects (22)-(32) is provided, wherein the predetermined coating removal pattern has a width of between about 100 µm and about 4.0 mm.

According to another aspect (34) of the present disclosure, the method of any of aspects (22)-(33) is provided, wherein the predetermined coating removal pattern has a width of between about 200 µm and about 2.0 mm.

It will be apparent to those skilled in the art that various modifications and variations can be made without departing from the spirit or scope of the present disclosure.

What is claimed is:

1. A method for laser preparation and laser cutting of a coated substrate, the method comprising:
    substantially removing a target portion of a polymer coating from a substrate to form a coating removal pattern by directing an ablative laser beam to the target portion,
        wherein the target portion of the polymer coating has a width between about 100 nm and about 4.0 mm,
        wherein the ablative laser beam has a wavelength that is absorbed by the polymer coating, and
        wherein the substrate comprises a material transparent to the wavelength of the ablative laser beam; and
    directing a cutting laser beam along the coating removal pattern and separating the substrate into at least two coated parts.

2. The method of claim 1, wherein directing the ablative laser beam to the target portion comprises applying at least one laser pulse to the target portion of the polymer coating.

3. The method of claim 2, further comprising, subsequent to applying the at least one laser pulse to the target portion of the polymer coating, aligning the ablative laser beam with a subsequent target portion of the polymer coating and applying at least one subsequent laser pulse to the subsequent target portion of the polymer coating to substantially remove the subsequent target portion of the polymer coating from the substrate.

4. The method of claim 3, wherein at least a part of the subsequent target portion of the polymer coating overlaps with at least a part of the target portion of the polymer coating.

5. The method of claim 3, wherein aligning the ablative laser beam with the subsequent target portion of the polymer coating is performed according to the coating removal pattern.

6. The method of claim 5, wherein the coating removal pattern is a substantially straight line having a substantially uniform width.

7. The method of claim 1, wherein directing an ablative laser beam to the target portion comprises positioning a source of the ablative laser beam proximate to a coated surface of the substrate and applying at least one laser pulse to the target portion of the polymer coating.

8. The method of claim 1, further comprising extracting residual products from the removal of the target portion of the polymer coating.

9. The method of claim 8, further comprising positioning an apparatus having at least one suction opening proximate to the target portion of the polymer coating.

10. The method of claim 9, further comprising positioning at least one gas discharge opening proximate to the target portion of the polymer coating.

11. The method of claim 1, wherein the polymer coating comprises a material that is selected from the group consisting of high-refractive-index polymers (HRIP), protective polymer films, and photoresist materials.

12. A method for laser cutting a coated substrate, the method comprising:
   substantially removing a plurality of target portions of a polymer coating from a substrate to form a predetermined coating removal pattern by directing an ablative laser beam to the plurality of target portions,
   directing a cutting laser beam along the predetermined coating removal pattern; and
   separating the substrate into at least two coated parts,
   wherein the predetermined coating removal pattern has a width of between about 10 µm and about 6.0 mm, and
   wherein the substrate comprises a material transparent to the wavelength of the ablative laser beam.

13. The method of claim 12, wherein directing the cutting laser beam along the predetermined coating removal pattern comprises focusing the cutting laser beam into a cutting laser beam focal line at a plurality of locations in the substrate to generate induced absorption along the cutting laser beam focal line in the substrate and to form a damage track along the cutting laser beam focal line at each of the plurality of locations in the substrate.

14. The method of claim 13, wherein the damage tracks at each of the plurality of locations in the substrate form a lateral connection of damage tracks.

15. The method of claim 13, wherein the cutting laser beam focal line has a length of between about 0.1 mm and about 100 mm.

16. The method of claim 12, wherein directing the ablative laser beam to the plurality of target portions comprises applying at least one laser pulse to each of the plurality of target portions of the polymer coating.

17. The method of claim 12, wherein directing the cutting laser beam along the predetermined coating removal pattern comprises directing the cutting laser beam such that the cutting laser beam does not contact the polymer coating of the substrate.

18. The method of claim 12, wherein separating the substrate into at least two coated parts comprises applying thermal stress to the substrate.

19. The method of claim 12, wherein separating the substrate into at least two coated parts comprises applying mechanical stress to the substrate.

20. The method of claim 12, wherein the cutting laser beam is generated by a laser source selected from the group consisting of an Nd:YAG laser with a wavelength of 1064 nm, a Yb:YAG laser with a wavelength of 1030 nm, and an Er:YAG laser with a wavelength of between about 1.5 µm and about 1.8 µm.

21. The method of claim 12, wherein the predetermined coating removal pattern has a width of between about 100 µm and about 4.0 mm.

22. The method of claim 1, wherein the substrate is comprised of glass.

* * * * *

UNITED STATES PATENT AND TRADEMARK OFFICE
CERTIFICATE OF CORRECTION

| | |
|---|---|
| PATENT NO. | : 11,904,410 B2 |
| APPLICATION NO. | : 15/285773 |
| DATED | : February 20, 2024 |
| INVENTOR(S) | : Alejandro Antonio Becker et al. |

It is certified that error appears in the above-identified patent and that said Letters Patent is hereby corrected as shown below:

In the Claims

In Column 12, Line 33, in Claim 1, delete "100 nm" and insert -- 100 μm --.

Signed and Sealed this
Twenty-fifth Day of June, 2024

Katherine Kelly Vidal
*Director of the United States Patent and Trademark Office*